(12) United States Patent
Kim et al.

(10) Patent No.: US 7,097,308 B2
(45) Date of Patent: Aug. 29, 2006

(54) HIGHLY EFFICIENT PROJECTION SYSTEM

(75) Inventors: Dae-sik Kim, Suwon-si (KR); Kun-ho Cho, Suwon-si (KR); Sung-ha Kim, Seoul (KR); Hee-Joong Lee, Anyang-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 140 days.

(21) Appl. No.: 10/761,420

(22) Filed: Jan. 22, 2004

(65) Prior Publication Data

US 2004/0233390 A1     Nov. 25, 2004

Related U.S. Application Data

(60) Provisional application No. 60/457,918, filed on Mar. 28, 2003.

(30) Foreign Application Priority Data

May 24, 2003    (KR)    ................. 10-2003-0033243

(51) Int. Cl.
*G03B 21/14*    (2006.01)
(52) U.S. Cl. .............. 353/31; 353/20; 349/7; 348/743
(58) Field of Classification Search ............. 353/20, 353/31, 33, 34, 37, 84; 349/5, 7, 8, 9; 348/742, 348/743, 771
See application file for complete search history.

(56) References Cited

U.S. PATENT DOCUMENTS

| | | | |
|---|---|---|---|
| 6,057,894 A * | 5/2000 | Kobayashi | 349/5 |
| 6,122,103 A | 9/2000 | Perkins et al. | |
| 6,288,815 B1 * | 9/2001 | Lambert | 359/196 |
| 6,332,684 B1 * | 12/2001 | Shibatani et al. | 353/31 |
| 6,588,906 B1 * | 7/2003 | Hwang | 353/31 |
| 6,667,834 B1 * | 12/2003 | Itoh | 359/485 |
| 6,796,655 B1 * | 9/2004 | Seki | 353/20 |
| 2001/0038483 A1 | 11/2001 | Lambert | |
| 2002/0191154 A1 | 12/2002 | Shazad et al. | |

(Continued)

FOREIGN PATENT DOCUMENTS

EP    0 723 174 A2    7/1996

(Continued)

OTHER PUBLICATIONS

English Language Abstract JP 2001324760; Published Nov. 22, 2001; Minolta Co. Ltd.

(Continued)

*Primary Examiner*—William C. Dowling
(74) *Attorney, Agent, or Firm*—Sughrue Mion, PLLC

(57) ABSTRACT

A highly efficient projection system is provided, including a light source, a color separator, a scrolling unit, a light valve, a projection lens unit, and a polarization conversion system. The color separator separates an incident beam according to color. The scrolling unit includes at least one lens cell and converts a rotation of the lens cell into a rectilinear motion of an area of the lens cell through which light passes so the incident beam is scrolled. The light valve processes a beam transmitted by the color separator and the scrolling unit, according to an image signal and forms a color picture. The projection lens unit magnifies the color picture formed by the light valve and projects the magnified color picture onto a screen. The polarization conversion system is installed between the color separator and the light valve and converts the incident beam into a beam with a single polarization.

28 Claims, 15 Drawing Sheets

U.S. PATENT DOCUMENTS

2003/0081178 A1* 5/2003 Shimizu et al. ............... 353/20
2003/0095213 A1* 5/2003 Kanayama et al. ......... 348/742

FOREIGN PATENT DOCUMENTS

EP        1 253 787 A2    10/2002
JP        11-281930 A     10/1999
KR        1999-002347 A   1/1999

OTHER PUBLICATIONS

English Language Abstract JP 11125776; Published Oct. 21, 1997; Fuji Xerox Co. Ltd.

* cited by examiner

HIGHLY EFFICIENT PROJECTION SYSTEM

This application claims the priority of Korean Patent Application No. 2003-33243, filed on May 24, 2003, in the Korean Intellectual Property Office, and the benefit of U.S. Patent Provisional Application No. 60/457,918, filed on Mar. 28, 2003, in the U.S. Patent and Trademark Office, the disclosures of which are incorporated herein in their entirety by reference.

BACKGROUND OF THE INVENTION

1. Field of the Invention

The present invention relates to a projection system, and more particularly, to a highly efficient projection system which can be made more compact by using a single scrolling unit to scroll color bars and more light efficient by effectively utilizing polarization components.

2. Description of the Related Art

In general projection systems, a light valve, such as a liquid crystal display (LCD) or a Digital Micro-mirror Device (DMD), controls the on/off operation of light emitted from a light source on a pixel-by-pixel basis and forms a picture. A magnifying projection optical system provides the picture to a large screen.

Projection systems are classified into either 3-panel projection systems or single-panel projection systems, according to the number of light valves used. The 3-panel projection systems provide better optical efficiency than the single-panel projection systems, but are generally more complicated and expensive. The single-panel projection systems can have a smaller optical system than the three-panel projection systems. However, these single-panel systems provide only ⅓ of the optical efficiency of the three-panel projection systems because red (R), green (G), and blue (B) colors into which white light is separated are used sequentially. To be more specific, in a single-panel projection system, white light radiated from a white light source is separated into R, G, and B color beams using color filters, and the three color beams are sequentially transmitted to a light valve. The light valve operates according to the sequence of color beams received and creates images. As described above, a single-panel projection system uses color beams sequentially, therefore, the light efficiency is reduced to ⅓ the light efficiency of a three-panel projection system.

According to one color scrolling method designed to increase the optical efficiency of a single-panel projection system, white light is separated into R, G, and B color beams, and the three color beams are simultaneously sent to different locations on a light valve. Since an image cannot be produced until each of the R, G, and B color beams reach all pixels of the color areas in the light valve, the color beams are moved at a constant speed by a color scrolling means.

FIG. 1 shows a single-panel scrolling projection system disclosed as in U.S. Publication No. 2002/191154 A1. As shown in FIG. 1, white light emitted from a light source 100 passes through first and second lens arrays 102 and 104, a polarization conversion system (PCS) 105, and a condenser lens 107, and is separated into R, G, and B color beams by first through fourth dichroic filters 109, 112, 122, and 139. To be more specific, the red beam R and the green beam G, for example, are transmitted by the first dichroic filter 109 and advance along a first light path $L_1$, while the blue beam B is reflected by the first dichroic filter 109 and travels along a second light path $L_2$. The red beam R and the green beam G on the first light path $L_1$ are separated by the second dichroic filter 112. The second dichroic filter 112 transmits the red beam R along the first light path $L_1$ and reflects the green beam G along a third light path $L_3$.

The light emitted from the light source 100 is separated into the red beam R, the green beam G, and the blue beam B, and they are then scrolled while passing through corresponding first through third prisms 114, 135, and 142. The first through third prisms 114, 135 and 142 are disposed on the first through third light paths $L_1$, $L_2$, and $L_3$, respectively, and rotate at a uniform speed such that R, G, and B color bars are scrolled. The green beam G and the blue beam B that travel along the second and third light paths $L_2$ and $L_3$, respectively, are transmitted and reflected by the third dichroic filter 139, respectively, and then combined. Finally, the R, G, and B beams are combined by the fourth dichroic filter 122. The combined beam is transmitted by a polarization beam splitter (PBS) 127, which forms a picture using a light valve 130.

The scrolling of the R, G, and B color bars due to rotation of the first through third prisms 114, 135, and 142 is shown in FIG. 2. Scrolling represents the movement of color bars formed on the surface of the light valve 130 when the first, second, and third prisms 114, 135, and 142 corresponding to colors are synchronously rotated.

A color image obtained by turning on or off the individual pixels of the light valve 130 according to an image signal is magnified by a projection lens (not shown). Then, the magnified image is made incident on a screen.

Since the conventional projection system uses different light paths for each color as described above, different light path correction lenses must be included for each color, component parts for recollecting separated light beams must be further included, and separate component parts must be included for each color. Hence, the optical system becomes bulky, and the manufacture and assembly thereof is complicated, thus degrading the yield.

Three motors for rotating three scrolling prisms for three color beams generate a lot of noise during operation. Additionally, a projection system utilizing three motors is manufactured at a greater cost than a color wheel type projection system which utilizes a single motor.

In order to produce a color picture using a scrolling technique, color bars as shown in FIG. 2 must be moved at a constant speed. The conventional projection system must synchronize the light valve 130 with the three prisms 114, 135, and 142 in order to achieve scrolling. However, controlling the synchronization is not easy. Due to the circular motion of the scrolling prisms 114, 135, and 142, the color scrolling speed by the three scrolling prisms is irregular, consequently deteriorating the quality of the resultant image.

FIG. 3 is a magnification of the PCS 105 of FIG. 1. Referring to FIG. 3, an unpolarized beam emitted from the light source 100 of FIG. 1 passes through the second lens array 104 and is then incident upon the PCS 105. The PCS 105 converts an incident beam into a beam with a single polarization. The PCS includes a PBS array 123 and a ½ wavelength plate 122, which is installed adjacent to the PBS array 23 and which changes a polarization direction. In this structure, a first beam with a P polarization, among P and S polarizations of an unpolarized beam received from the second lens array 104, is transmitted by the PBS array 123, and a second beam with an S polarization is reflected by a mirror 123a for reflecting an S polarization. Thereafter, the second beam with the S polarization is re-reflected by the mirror 123a and then advanced in the same direction as the first beam with the P polarization. The second beam with an S polarization, oriented in the same direction as the first beam, is converted into a beam with a P polarization while passing through the ½ wavelength plate 122.

As described above, the PCS 105 increases the optical efficiency by converting an unpolarized incident beam into a beam with a single uniform polarization. However, the PCS 105 having the above-described structure generates a beam loss because of cell boundaries of the second lens array 104. Further, this structure is complicated.

SUMMARY OF THE INVENTION

An apparatus consistent with the present invention relates to a highly efficient and compact projection system utilizing a single scrolling unit to scroll color bars, which can increase the light efficiency by effectively utilizing polarization components.

According to a first exemplary embodiment of the present invention, there is provided a projection system comprising a light source, a color separator, a scrolling unit, a light valve, a projection lens unit, and a polarization conversion system that is installed between the color separator and the light valve. The color separator separates an incident beam according to color. The scrolling unit comprises at least one lens cell and converts the rotation of the lens cell into a rectilinear motion of an area of the lens cell through which light passes so that the incident beam is scrolled. The light valve processes a beam transmitted by the color separator and the scrolling unit, according to an image signal, and forms a color picture. The projection lens unit magnifies the color picture formed by the light valve and projects the magnified color picture onto a screen. The polarization conversion system is installed between the color separator and the light valve as described above and converts the incident beam into a beam with a single polarization.

According to one aspect of the first exemplary embodiment, a first and second fly-eye lens array are arranged on a light path between the color separator and the light valve, and the polarization conversion system is installed behind the second fly-eye lens array. The polarization conversion system comprises a plurality of polarization beam splitters disposed in a direction perpendicular to the traveling direction of light, and a plurality of ½ wavelength plates installed on emission surfaces of alternate polarization beam splitters. The thickness of each of the polarization beam splitters is half of the size of a lens cell of the second fly-eye lens array.

According to another aspect of the present invention, the color separator includes first, second, and third dichroic filters, installed aslant at different angles between the optical source and the scrolling unit, which each transmit a beam of a corresponding color from an incident beam and reflect beams of other colors.

According to another aspect of the present invention, the color separator includes first, second, and third dichroic prisms that are sequentially attached to one another between the optical source and the scrolling unit and which respectively include first, second, and third dichroic filters which each transmit a beam of one color from an incident beam and reflect beams of other colors.

According to another aspect of the present invention, the color separator includes first, second, and third dichroic filters that are installed in parallel between the optical source and the scrolling unit and which each transmit a beam of one color from an incident beam and reflect beams of other colors. The projection system further includes a prism installed in front of the first, second, and third dichroic filters.

According to another aspect of the present invention, the scrolling unit comprises a single spiral lens disk on which at least one cylindrical lens cell is spirally arranged.

According to another aspect of the present invention, the scrolling unit comprises first and second spiral lens disks, which are installed apart from each other and which each include at least one cylindrical lens cell that is spirally arranged. The scrolling unit further comprises a glass rod installed between the first and second spiral lens disks.

According to another aspect of the present invention, the projection system further includes a spatial filter, installed between the light source and the scrolling unit, having a slit for controlling the divergence angle or etendue of a beam emitted from the light source.

According to another aspect of the present invention, the projection system further comprises first and second cylindrical lenses respectively installed in front of and behind the scrolling unit.

According to another aspect of the present invention, the projection system further comprises a polarization beam splitter that is installed on a light path between the polarization conversion system and the light valve and which transmits a beam with a single polarization from an incident beam and reflects a beam with the other polarization. The polarization beam splitter can be a wire grid polarization beam splitter.

According to a second exemplary embodiment of the present invention, a projection system comprises a light source, a color separator, a scrolling unit, a light valve, a projection lens unit, and a polarization conversion system that is installed between the light source and the color separator. The color separator separates an incident beam according to color. The scrolling unit comprises at least one lens cell and converts the rotation of the lens cell into a rectilinear motion of an area of the lens cell through which light passes so that the incident beam is scrolled. The light valve processes a beam transmitted by the color separator and the scrolling unit, according to an image signal, and forms a color picture. The projection lens unit magnifies the color picture formed by the light valve and projects the magnified color picture onto a screen. The polarization conversion system is installed between the light source and the color separator as described above and converts the incident beam into a beam with a single polarization.

The polarization conversion system comprises a polarization separator, a reflector, and a ½ wavelength plate. The polarization separator reflects a first beam with a first linear polarization from a beam emitted from the light source and transmits a second beam with a second linear polarization. The reflector is installed apart from the polarization separator and reflects the second beam that is transmitted by the polarization separator and then reflected back to the polarization separator. The ½ wavelength plate is installed on the path of one of the first beam reflected by the polarization separator and the second beam that is reflected by the reflector and passed through the polarization separator. The ½ wavelength plate changes the polarization component of an incident beam.

The ½ wavelength plate is installed at or around the focal point of the first or second beam. A plurality of color beams are projected onto the light valve so that color bars are formed, and the incident beam is separated into the first and second beams in a direction perpendicular to the direction in which the color bars are arranged.

The polarization conversion system comprises a prism, on opposite sides of which are installed the polarization separator and the reflector, and through an incidence surface of which the beam emitted from the light source passes. The ½ wavelength plate is attached to an emission surface of the prism to integrate the polarization conversion system thereby.

BRIEF DESCRIPTION OF THE DRAWINGS

The above and other features and advantages of the present invention will become more apparent with reference to the following description, claims, and accompanying drawings, which should not be read to limit the invention in any way, in which:

DETAILED DESCRIPTION OF THE INVENTION

Figure 1:
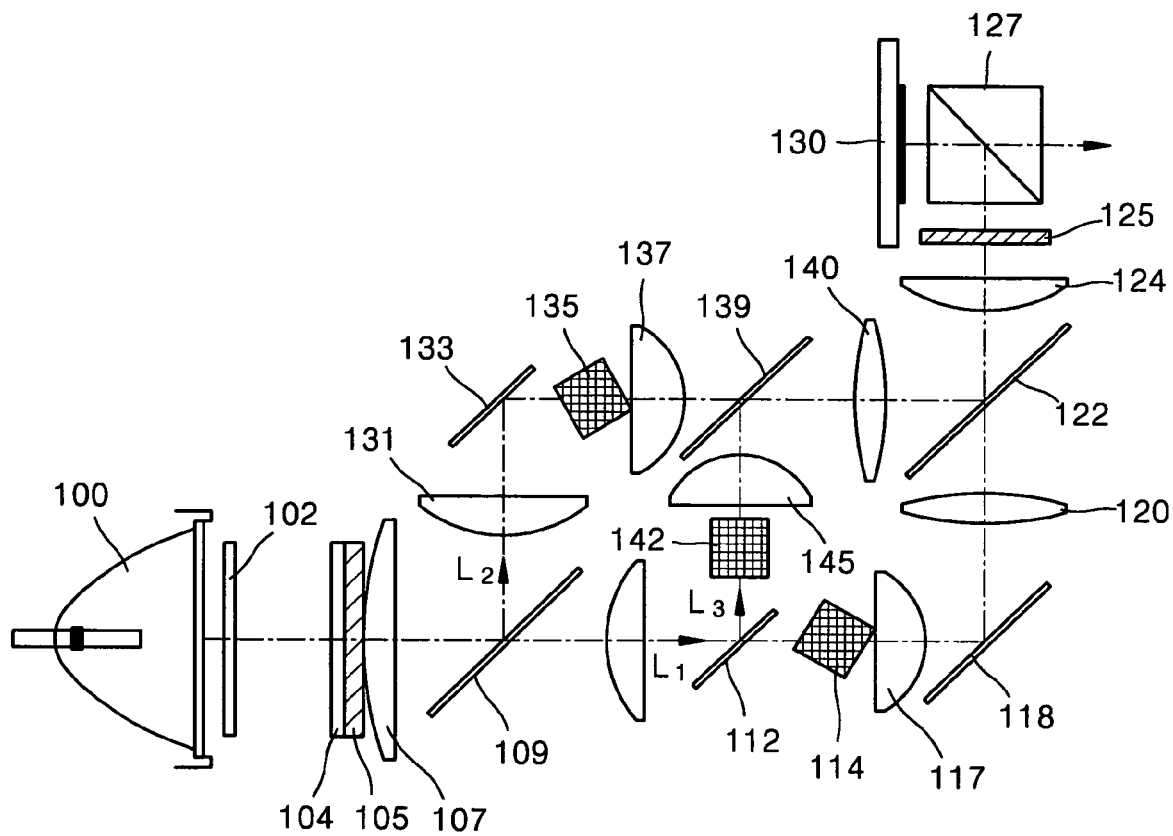
FIG. 1 is a schematic diagram of a conventional projection system.
Figure 2:
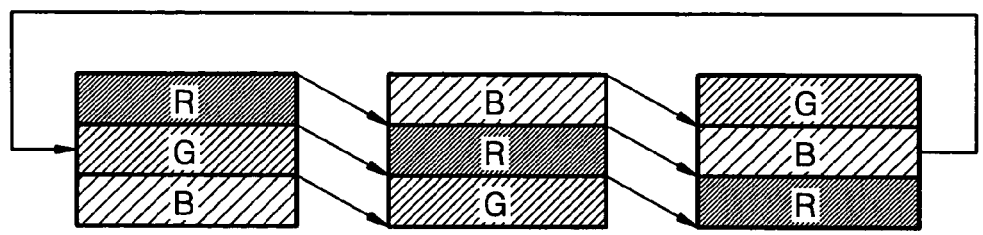
FIG. 2 is an illustration of R, G, and B color bars according to a conventional projection system.
Figure 3:
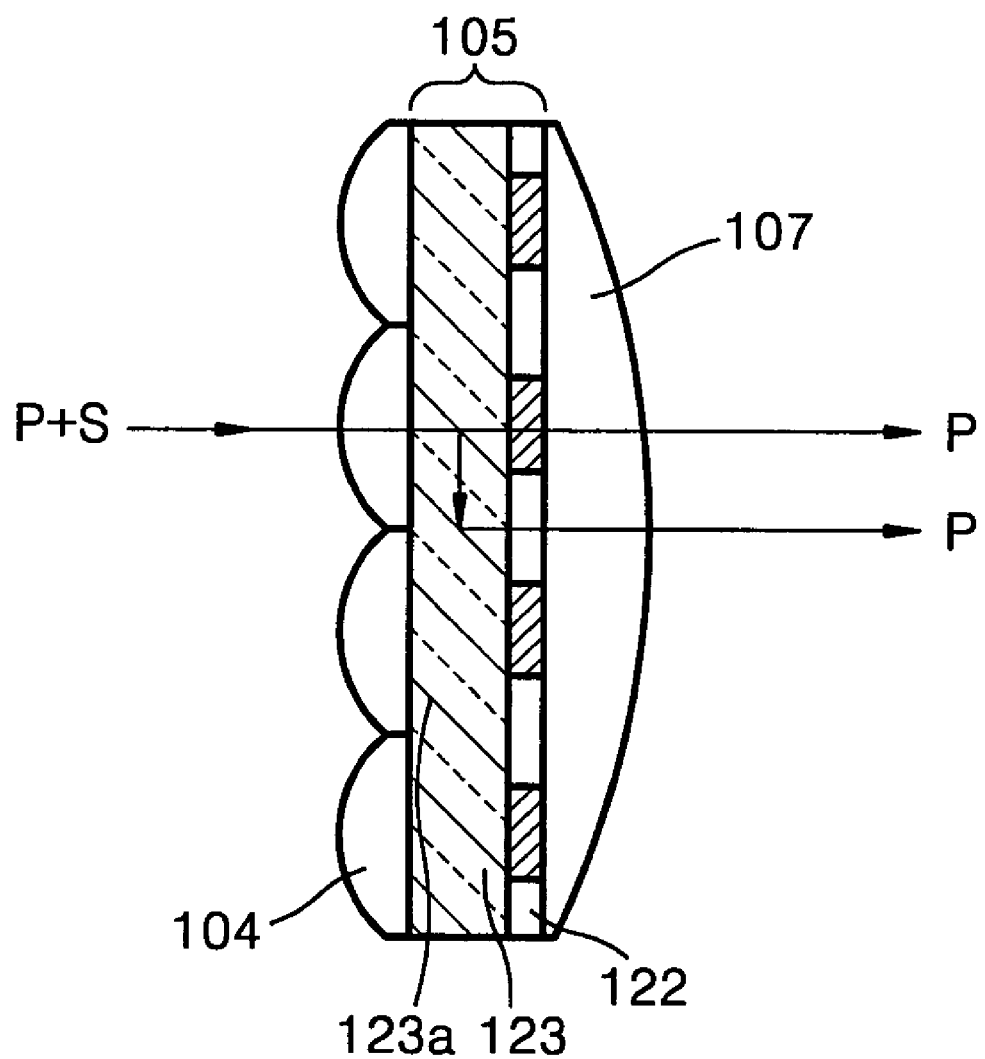
FIG. 3 is a magnified view of the polarization conversion system (PCS) of FIG. 1.

The present invention will now be described more fully with reference to the accompanying drawings, in which exemplary embodiments of the invention are shown. In the drawings, like reference numbers refer to like elements throughout, and the sizes of elements may be exaggerated for clarity.

Figure 4:
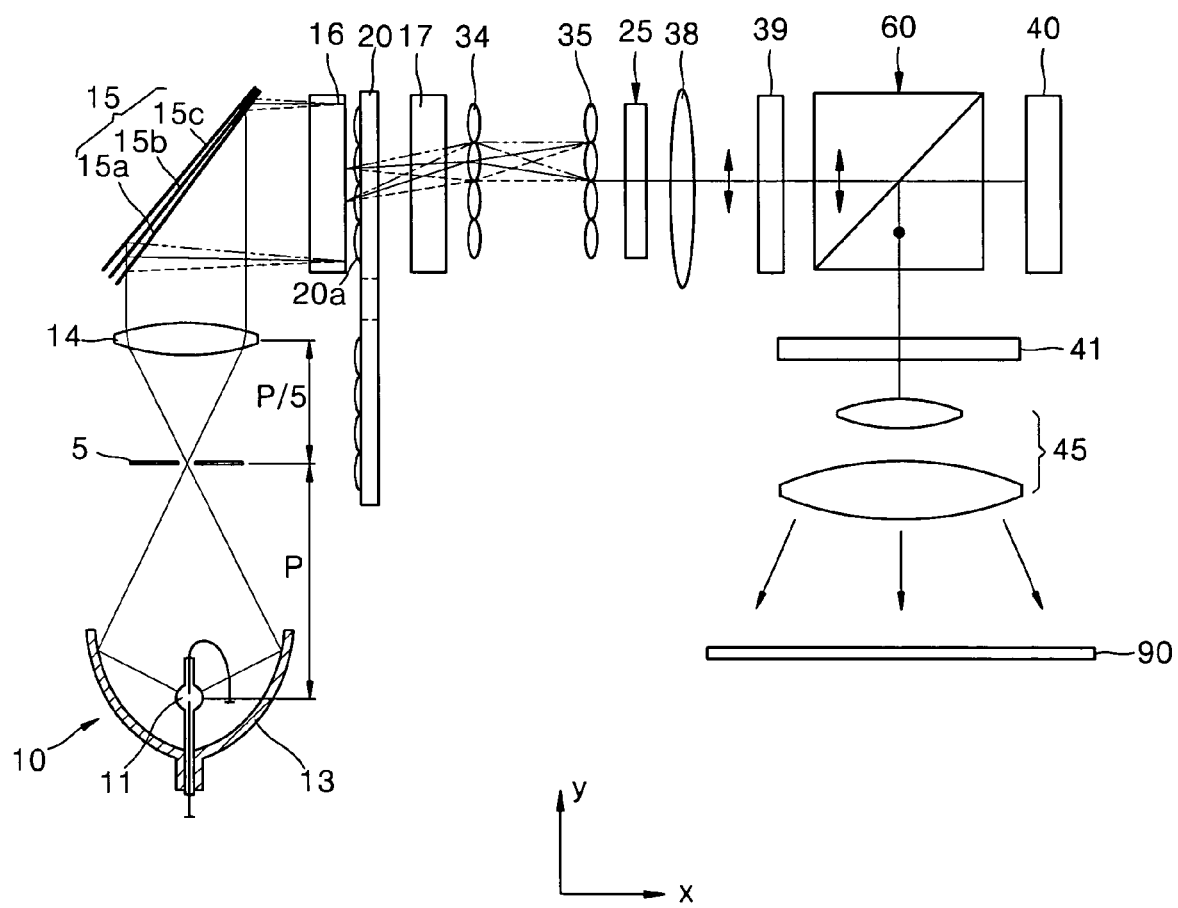
FIG. 4 is a schematic diagram of a projection system according to a first exemplary embodiment of the present invention.

FIG. 4 is a schematic diagram of a projection system according to a first exemplary embodiment of the present invention. Referring to FIG. 4, the projection system according to the first exemplary embodiment of the present invention includes a light source 10, a color separator 15, a scrolling unit 20, a polarization conversion system (PCS) 25, a light valve 40, and a projection lens unit 45. The color separator 15 separates light emitted from the light source 10 according to color. The scrolling unit 20 scrolls R, G, and B color beams, into which light has been separated by the color separator 15. The PCS 25 converts the beams scrolled by the scrolling unit 20 into beams having a single polarization. The light valve 40 processes the scrolled beams according to an image signal and forms a picture. The projection lens unit 45 magnifies the picture formed by the light valve 40 and projects the magnified picture onto a screen 90.

The light source 10 emits white light and comprises a lamp 11, for generating light, and a reflection mirror 13, for reflecting light emitted from the lamp 11 and for guiding the path of the reflected light. The reflection mirror 13 may be an elliptical mirror whose first focal point is the position of the lamp 11 and whose second focal point is a point where light is focused. Alternatively, the reflection mirror 13 may be a parabolic mirror which uses the lamp 11 as a focal point and which collimates light beams emitted from the lamp 11. The reflection mirror 13 shown in FIG. 4 is an elliptical mirror. If a parabolic mirror is used as the reflection mirror 13, a lens for focusing light must also be included.

A collimating lens 14 for collimating incident light is installed on a light path between the light source 10 and the optical splitter 15. P denotes the distance between the light source 10 and the focal point of the reflection mirror where light emitted from the light source 10 is focused. The collimating lens 14 may be installed at a distance of P/5 from the focal point. By installing a projection system in this way, the structure of an optical system can be made more compact.

A spatial filter 5, having a slit, is installed between the light source 10 and the collimating lens 14. The spatial filter 5 controls the divergence angle (or etendue) of light emitted from the light source 10 and is preferably, but not necessarily installed at the focal point of the reflection mirror 13. The spatial filter 5 can control the width of the slit. The width of the slit may be controlled in a color separation direction or a color scrolling direction.

The color separator 15 separates the light emitted from the light source 10 into three color beams, namely, R, G, and B beams. The color separator 15 is constructed with first, second, and third dichroic filters 15a, 15b, and 15c disposed aslant at different angles with respect to an incident light axis. The color separator 15 separates incident light according to a predetermined wavelength range and advances the separated light beams at different angles. For example, the first dichroic filter 15a reflects a beam in the red wavelength range, R, from white incident light and, at the same time, transmits beams in the green and blue wavelength ranges, G and B. The second dichroic filter 15b reflects the G beam from the beams transmitted by the first dichroic filter 15a and, at the same time, transmits the B beam. The third dichroic filter 15c reflects the B beam transmitted by the first and second dichroic filters 15a and 15b. Consequently, the R, G, and B beams, into which incident light has been separated according to wavelength by the first, second, and third dichroic filters 15a, 15b, and 15c, are reflected at different angles. The R and B beams are focused on the G beam and then made incident upon the scrolling unit 20.

The scrolling unit 20 includes at least one lens cell through which light passes and scrolls the light separated by the color separator 15. The scrolling unit 20 scrolls incident color beams by converting the rotation of the lens cell into a rectilinear motion of an area of the lens cell through which light passes. This scrolling will be described later in detail.

Figure 5:
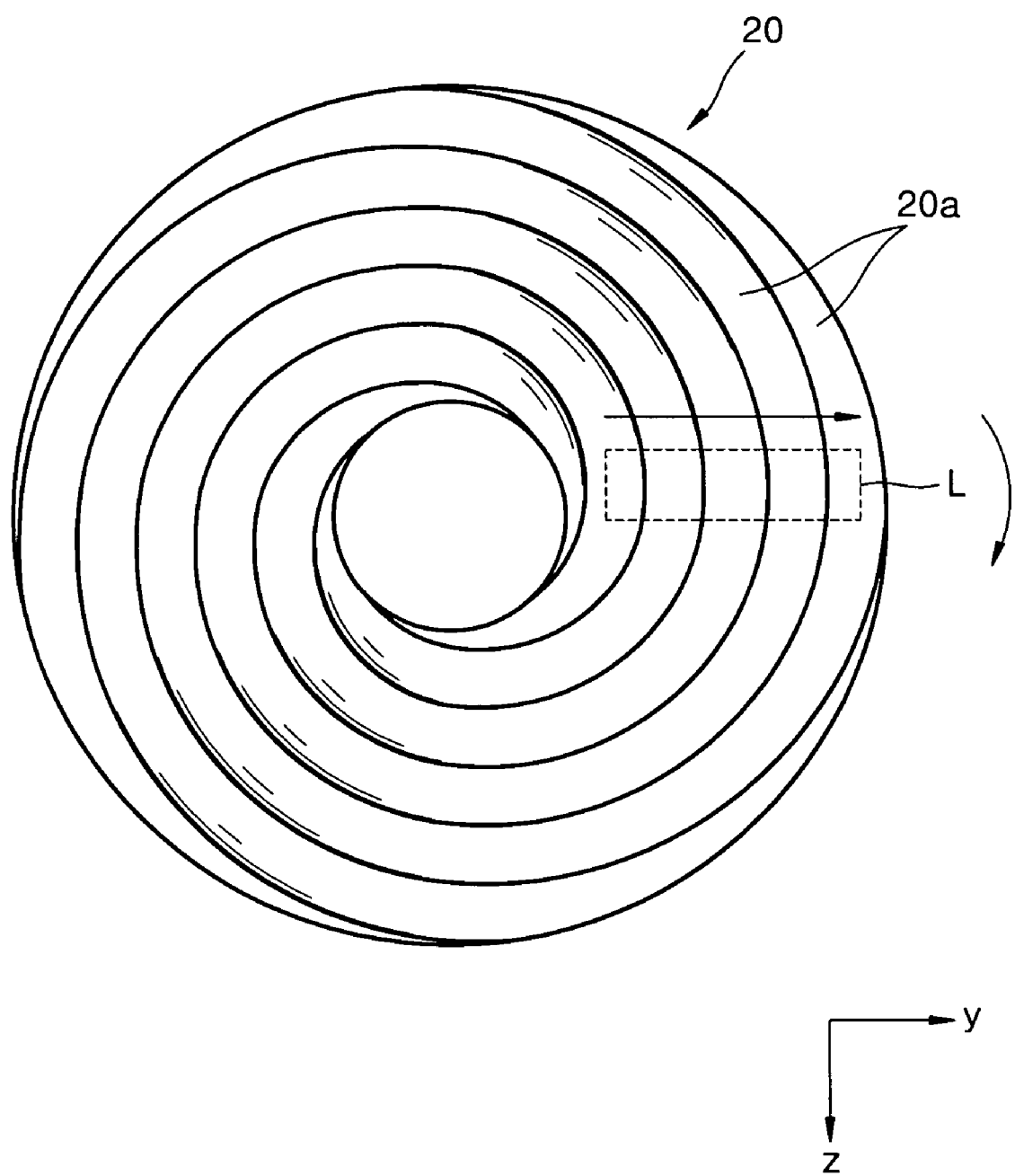
FIG. 5 is a front view of the scrolling unit of FIG. 4.

The scrolling unit 20 of FIG. 4 is a spiral lens disk formed by spirally arranging at least one cylindrical lens cell 20a as shown in FIG. 5. FIG. 5 is a front view of the scrolling unit 20. In FIG. 5, reference character L denotes an area of the scrolling unit 20 on which a beam is incident.

Figure 6:
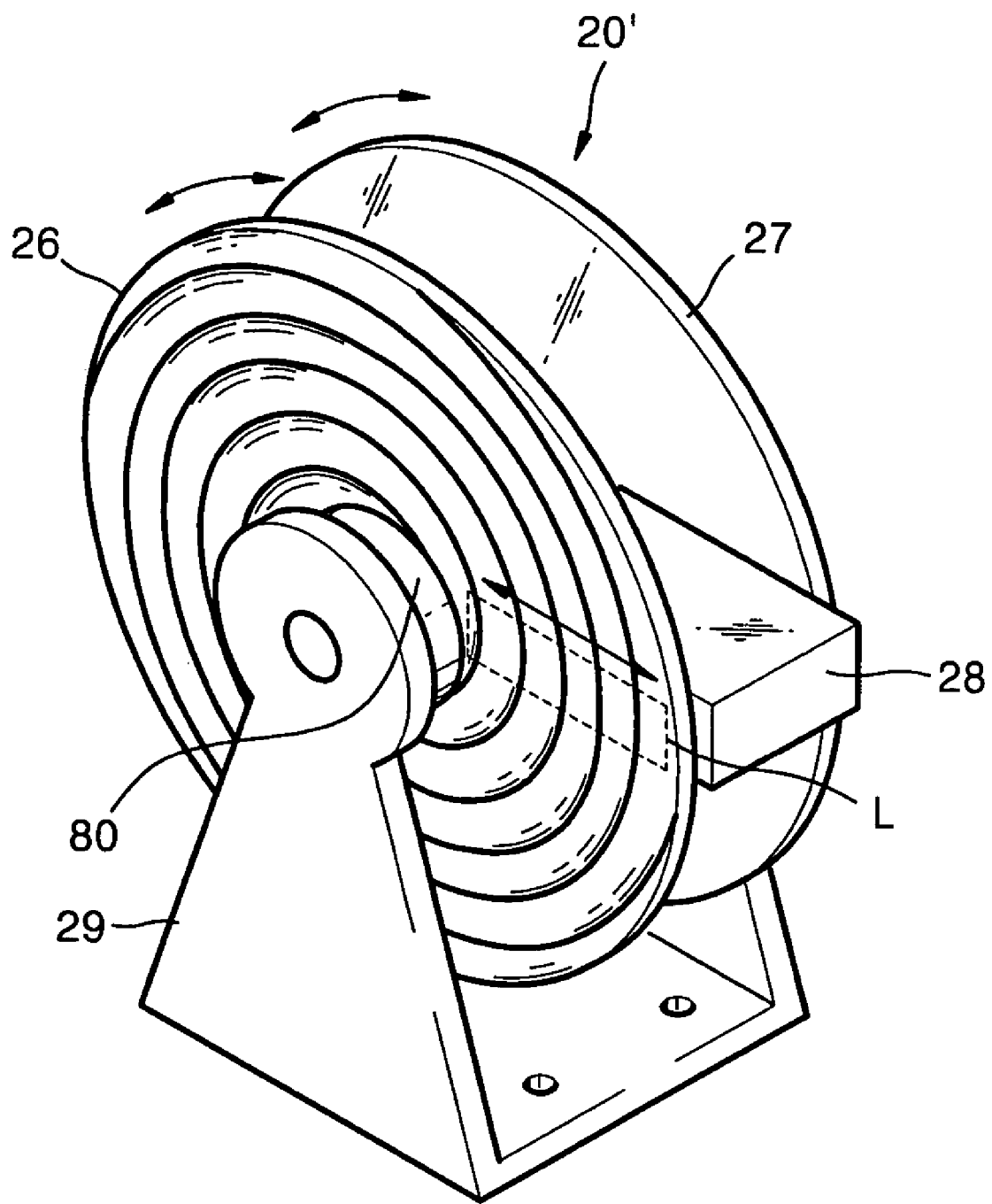
FIG. 6 is a perspective view of an alternate scrolling unit according to the first exemplary embodiment of the present invention.

FIG. 6 is a perspective view of a scrolling unit 20' that can be adopted in the projection system of FIG. 4. As shown in FIG. 6, the scrolling unit 20' can include first and second spiral lens disks 26 and 27 disposed a predetermined distance apart from each other, and a glass rod 28 installed between the first and second spiral lens disks 26 and 27. Each of the first and second spiral lens disks 26 and 27 is formed by spirally arranging cylindrical lens cells on at least one side of each of the first and second spiral lens disks 26 and 27. The cross-sections of the first and second spiral lens disks 26 and 27 are cylindrical lens arrays. The first and second spiral lens disks 26 and 27 are installed so as to rotate and are supported by a bracket 29 so that they can be rotated at a uniform speed by a driving source 80.

First and second cylindrical lenses 16 and 17 are installed in front of and behind the scrolling unit, respectively. First and second fly-eye lens arrays 34 and 35 and a relay lens 38 are installed on a light path between the second cylindrical lens 17 and the light valve 40. The width of a light beam incident upon the scrolling unit 20 is reduced by the first cylindrical lens 16, thereby reducing loss of light. The light transmitted by the scrolling unit 20 is returned to its original state by the second cylindrical lens 17.

The PCS 25 for converting an unpolarized light beam transmitted by the second fly-eye lens array 35 into a light beam with a single polarization is installed between the second fly-eye lens array 35 and the relay lens 38.

Figure 7:
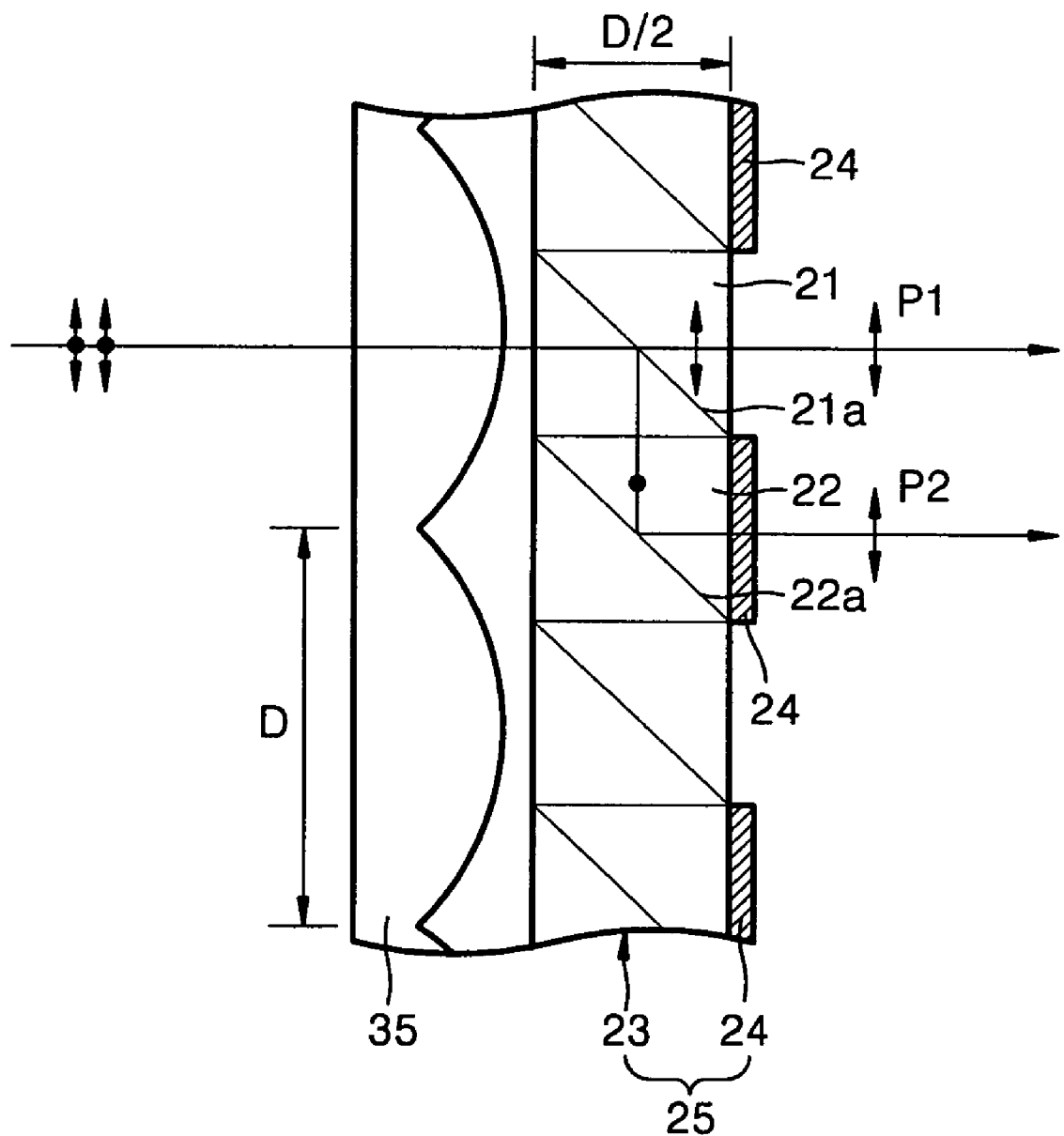
FIG. 7 is a magnified view of the PCS of FIG. 4.

FIG. 7 is a magnified view of the PCS 25 of FIG. 4. Referring to FIG. 7, the PCS 25 comprises a polarization beam splitter (PBS) array 23 and a ½ wavelength plate 24. The PBS array 23 comprises first and second PBSs 21 and 22 that are installed perpendicular to the traveling direction of the light beam. The ½ wavelength plate 24 is installed on an emission surface of the second PBS 22. The thickness of the PBS array 23 may be half of the size (D) of a lens cell of the second fly-eye lens array 35.

The first PBS 21 transmits a first light beam having one polarization from an unpolarized light beam transmitted by the second fly-eye lens array 35 toward the relay lens 38, and at the same time, reflects a second light beam having the other polarization toward the second PBS 22. To reflect the second light beam, the first PBS 21 includes a first polarization filter 21a. As shown in FIG. 7, when a white light beam formed by combining light having a P polarization (which is parallel to the paper) and light having an S polarization (which is perpendicular to the paper) is incident upon the first PBS 21, the first polarization filter 21a transmits the light with the P polarization and reflects the light with the S polarization.

The second PBS 22 reflects the second light beam reflected by the first PBS 21 so that the second light beam advances toward the relay lens 38. The second PBS 22 changes only the path of an incident light beam without changing its polarization, and the second light beam, transmitted by the second PBS 22, travels parallel to the first light beam, transmitted by the first PBS 21. The second PBS 22 comprises a second polarization filter 22a for reflecting a light beam with a specific polarization component, for example, the S polarization component among the unpolarized light beam transmitted by the second fly-eye lens array 35. The second polarization filter 22a may be a total reflection mirror for totally reflecting an incident light beam.

The ½ wavelength plate 24 changes a received light beam of one polarization to a light beam of the other polarization. As shown in FIG. 7, the ½ wavelength plate 24 changes the first light beam having an S polarization reflected by the second polarization filter 22a to a light beam having a P polarization like the first light beam.

Instead of being installed on the emission surface of the second PBS 22, the ½ wavelength plate 24 may be installed on the emission surface of the first PBS 21 so that the polarization of the first light beam is changed to that of the second light beam.

Due to the use of the PCS 25, all of the light emitted from the light source 10 can be used, which increases the light efficiency.

A PBS 60 for transmitting or reflecting light transmitted by the relay lens 38 according to polarization is installed between the relay lens 38 and the light valve 40. The PBS 60 reflects a light beam having one polarization, for example an S polarization, of the incident unpolarized light and transmits a light beam having the other polarization, for example a P polarization.

Figure 8:
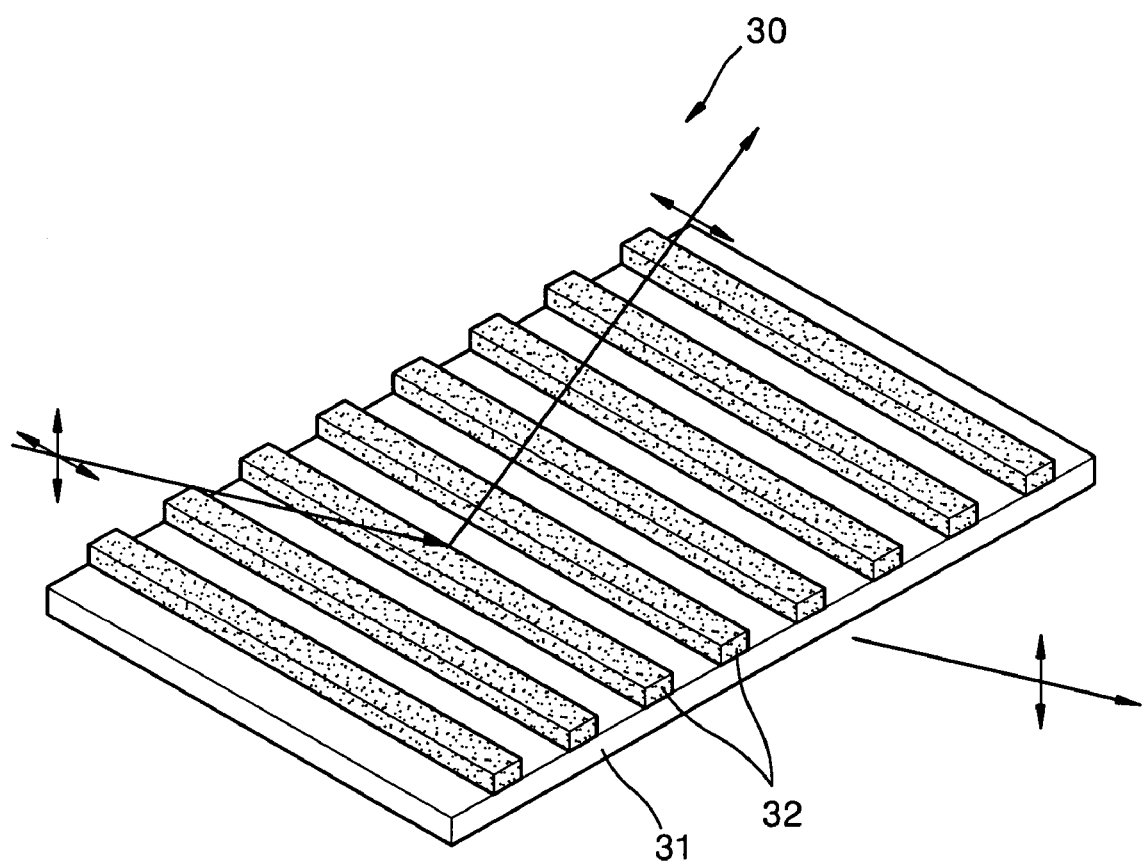
FIG. 8 is a perspective view of a wire grid polarization beam splitter that can be adopted in the projection system according to the first exemplary embodiment of the present invention.

Instead of the PBS 60, a wire grid PBS 30 of FIG. 8 can be adopted in the projection system according to the first exemplary embodiment of the present invention. Referring to FIG. 8, the wire grid PBS 30 includes a substrate 31 and wire grids 32 that are arranged in parallel at a regular interval on one side of the substrate 31. The substrate 31 is made of glass, and the wire grids 32 are formed of a conductive material.

The light valve 40 processes the light transmitted by the PBS 60 according to an image signal and forms a color picture. The light valve 40 is a reflective liquid crystal display. The polarization of the light transmitted by the PBS 60 is changed by modulation of each of the cells of the light valve 40, and the resultant light is reflected by the PBS 60 toward the projection lens unit 45.

The projection lens unit 45 magnifies the color picture formed by the light valve 40 and projects the magnified color picture onto the screen 90. In FIG. 4, reference numerals 39 and 41 denote a polarizer and an analyzer, respectively.

The operation of a projection system according to the first embodiment of the present invention having the above-described configuration will now be described referring to FIG. 4. First, white light emitted from the light source 10 is incident upon the color separator 15 via the spatial filter 5 and the collimating lens 14.

Next, the white light incident upon the color separator 15 is separated into three color beams, namely, R, G, and B color beams by the first, second, and third dichroic filters 15a, 15b, and 15c, and the R, G, and B color beams are incident upon the scrolling unit 20. The width of the light transmitted by the first, second, and third dichroic filters 15a, 15b, and 15c is reduced by the first cylindrical lens 16 installed in front of the scrolling unit 20. The light is then incident upon the scrolling unit 20.

Figure 9A:
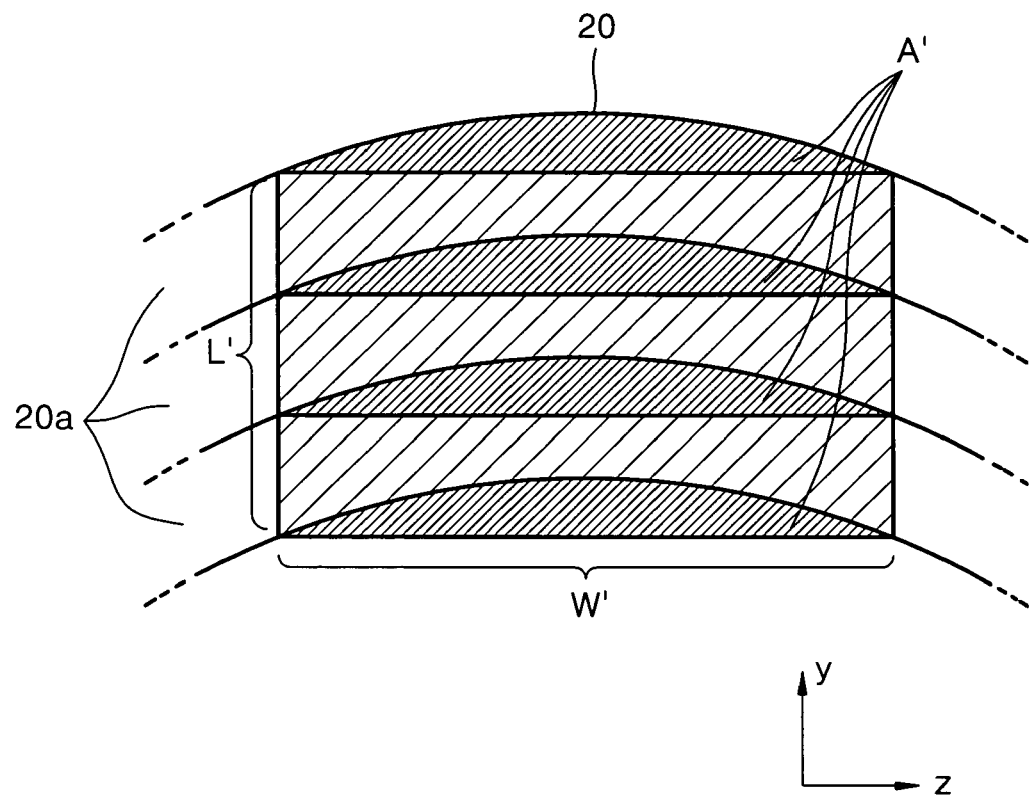
FIG. 9A shows the shape of a beam on a spiral lens disk when no cylindrical lenses are used in a projection system according to the first exemplary embodiment of the present invention.
Figure 9B:
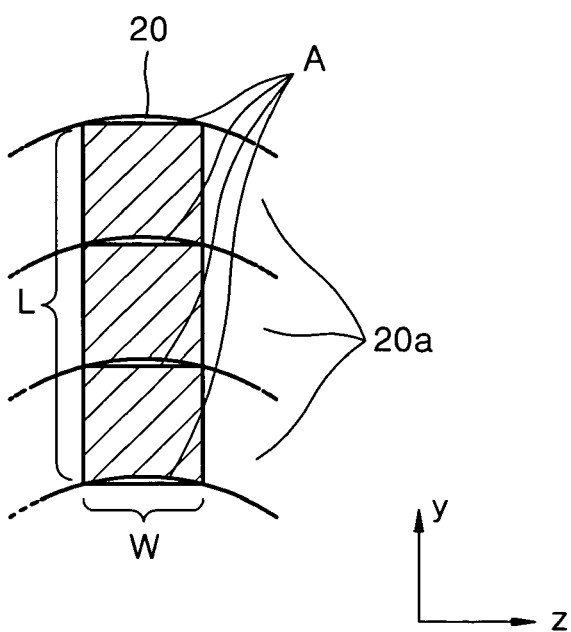
FIG. 9B shows the shape of a beam on a spiral lens disk when a cylindrical lens is used in a projection system according to the first exemplary embodiment of the present invention.

FIG. 9A shows the cross-section of a beam L' incident on the scrolling unit 20 without passing through the first cylindrical lens 16. Beam L' has a width W'. FIG. 9B shows the cross-section of a beam-L that has a width W reduced by the first cylindrical lens 16 and which is then incident upon the scrolling unit 20. In the case of the beam L' that is, when a beam passing through the scrolling unit 20 is relatively wide, the curved shape of the spiral lens array does not match with that of the beam L', and thus there is light loss over an unmatched area A' for each color. To minimize the light loss, the first cylindrical lens 16 is provided to produce the beam L with a reduced width, as shown in FIG. 9B. The shape of the spiral lens array, as shown in FIG. 9B, aligns more closely with that of the beam L. The unmatched area A, for each color, when the first cylindrical lens 16 is used is smaller than the unmatched area A', when a cylindrical lens is not used. Consequently, the light loss is reduced by the use of the cylindrical lens.

Referring back to FIG. 4, the width of the light previously reduced by the scrolling unit 20 is returned to the original width by the second cylindrical lens 17. As described above, by controlling the width of light using the first and second cylindrical lenses 16 and 17, light loss can be reduced, and also the quality of the resultant color picture can be improved.

Figure 10A:
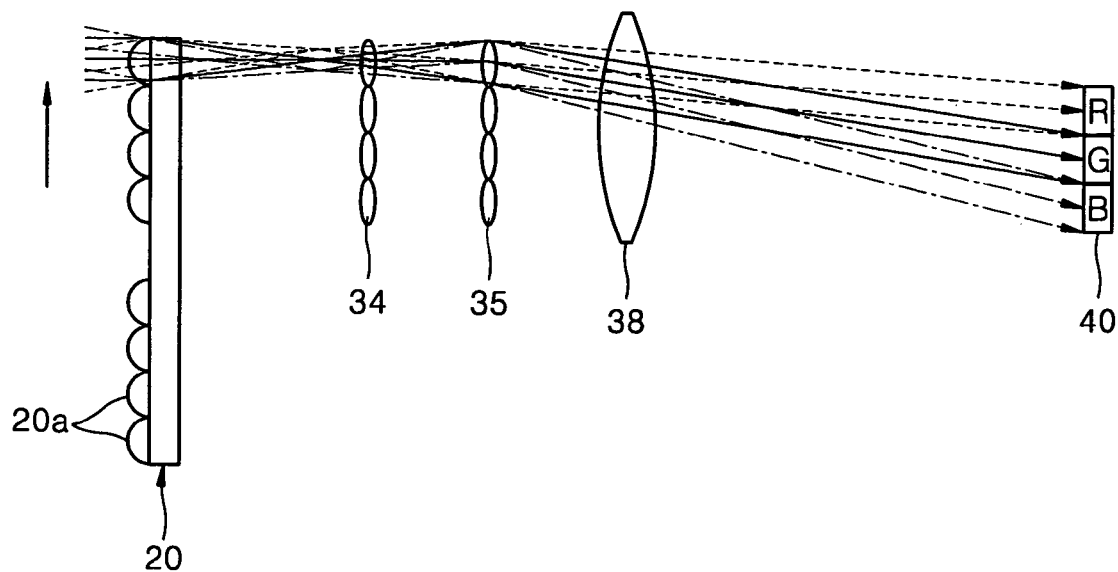
FIGS. 10A through 10C show the scrolling operation of a projection system according to the first exemplary embodiment of the present invention.

Next, the R, G, and B color beams transmitted by the second cylindrical lens 17 are focused on each of the lens cells of the first and second fly-eye lens arrays 34 and 35. After the R, G, and B beams pass through the lens cells of the first and second fly-eye lens arrays 34 and 35, they are separated and focused on corresponding color areas of the light valve 40 via the relay lens 38, as shown in FIG. 10A. Before being incident upon the relay lens 38, the light transmitted by the second fly-eye lens array 35 is converted into light having a single polarization by the PCS 25.

Before being focused on the light valve 40, the light transmitted by the relay lens 38 passes through the polarizer 39 and the PBS 60. After light is focused on the light valve 40, it is reflected thereby toward the PBS 60. At this time, the polarization of the reflected light is changed by modulation of each of the cells of the light valve 40. Then, the light with the changed polarization is received and reflected by the PBS 60 toward the analyzer 41 and the projection lens unit 45.

Figure 10B:
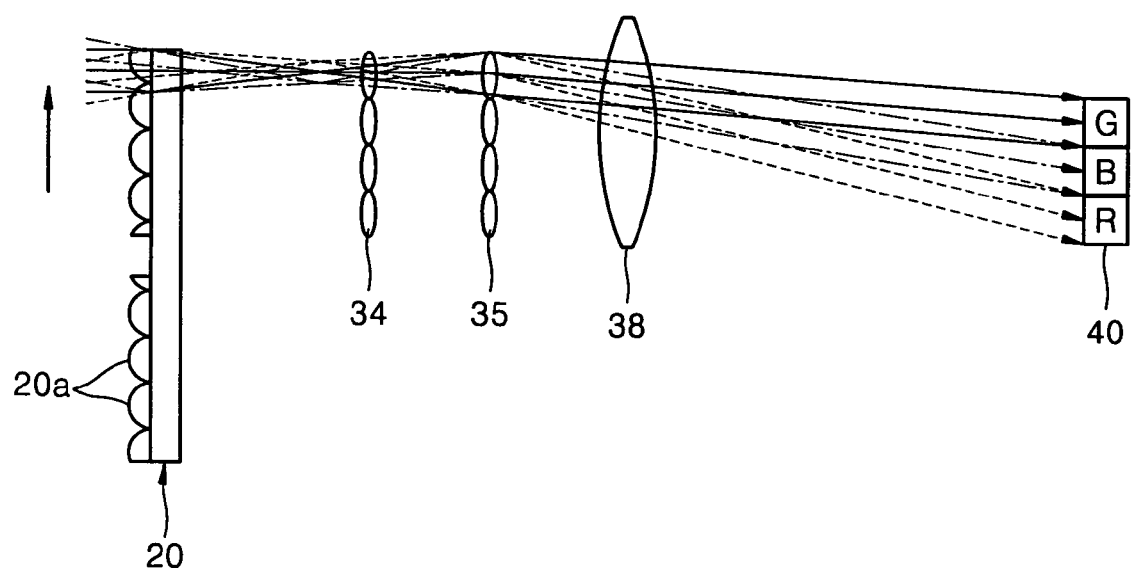
Figure 10C:
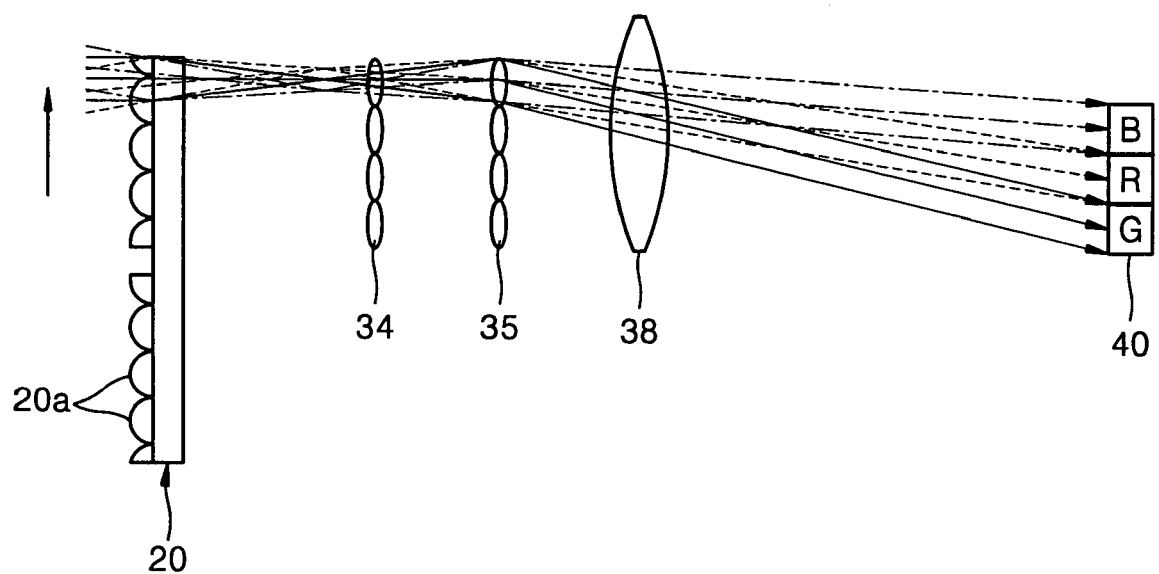

The scrolling of color bars formed on the light valve will now be described with exemplary reference to FIGS. 10A through 10C. It is assumed that the scrolling unit 20 rotates in the direction indicated by an arrow as shown in FIG. 5.

First, as shown in FIG. 10A, the R, G, and B beams obtained by the color separator 15 of FIG. 4 are incident upon each of the lens cells 20a of the scrolling unit 20. The R, G, and B beams transmitted by the first and second fly-eye lens arrays 34 and 35 are separated and focused on corresponding color areas of the light valve 40 via the relay lens 30. Hence, R, G, and B color bars are formed on the light valve 40. The first and second fly-eye lens arrays 34 and 35 serve as a color bar formation means for separating and focusing incident color beams on corresponding color areas of the light valve 40. First, light passes through the scrolling unit 20, the fly eye lens array 25, and the relay lens 38 and forms color bars on the light valve 40, for example, in an R, G, and B order. Next, as the scrolling unit 20 rotates, the lens surface of the scrolling unit 20 gradually moves upward while the light passes through the scrolling unit 20. Accordingly, the focal points of the color beams passing through the scrolling unit 20 vary as the scrolling unit 20 moves, and color bars in a G, B, and R order as shown in FIG. 10B are formed. Then, as the scrolling unit 20 rotates so that the incident color beams are scrolled, color bars in a B, R, and G order as shown in FIG. 10C are formed. In other words, the locations of lenses upon which beams are incident change according to the rotation of the scrolling unit 20, and the rotation of the scrolling unit 20 is converted into a rectilinear motion of a cylinder lens array when viewed from the cross-section of the spiral lens disk 20 so that scrolling is performed. Such scrolling is periodically repeated as the scrolling unit 20 rotates.

Color lines are formed on each of the lens cells 20a of the scrolling unit 20, and likewise, color lines are formed on each of the lens cells of the first fly-eye lens array 34. Lens cells 20a of the scrolling unit 20 through which light passes can be matched with row arrays of the first and second fly-eye lens arrays 34 and 35 in a one-to-one correspondence. In other words, if the number of lens cells 20a occupied by light passing through the scrolling unit 20 is 4, each of the first and second fly-eye lens arrays 34 and 35 can have 4 row arrays.

The number of lens cells 20a of the scrolling unit 20 can be controlled to synchronize the scrolling unit 20 with the operating frequency of the light valve 40. That is, if the operating frequency of the light valve 40 is high, more lens cells 20a are included so that the scrolling speed can be faster while keeping the rotation speed of the scrolling unit 20 constant. Alternatively, the scrolling unit 20 can be synchronized with the operating frequency of the light valve 40 by controlling the rotation speed of the scrolling unit 20 while maintaining the number of lens cells 20a of the scrolling unit 20.

Although an example where the scrolling unit 20 comprises a single spiral lens disk on which a plurality of cylindrical lens cells 20a are spirally arranged is described above, various modifications can be made to the entire shape of the scrolling unit 20 in order to convert the rotation of the scrolling unit 20 into a rectilinear motion of a lens array so that color scrolling is performed by another design. Hence, as shown in FIG. 6, the scrolling unit 20 may be constituted of a plurality of spiral lens disks according to a design condition.

As described above, in the present invention, a single scrolling unit can deal with all colors without the need to install a separate scrolling unit for each individual color. Thereby, a projection system can be made more compact.

Figure 11:
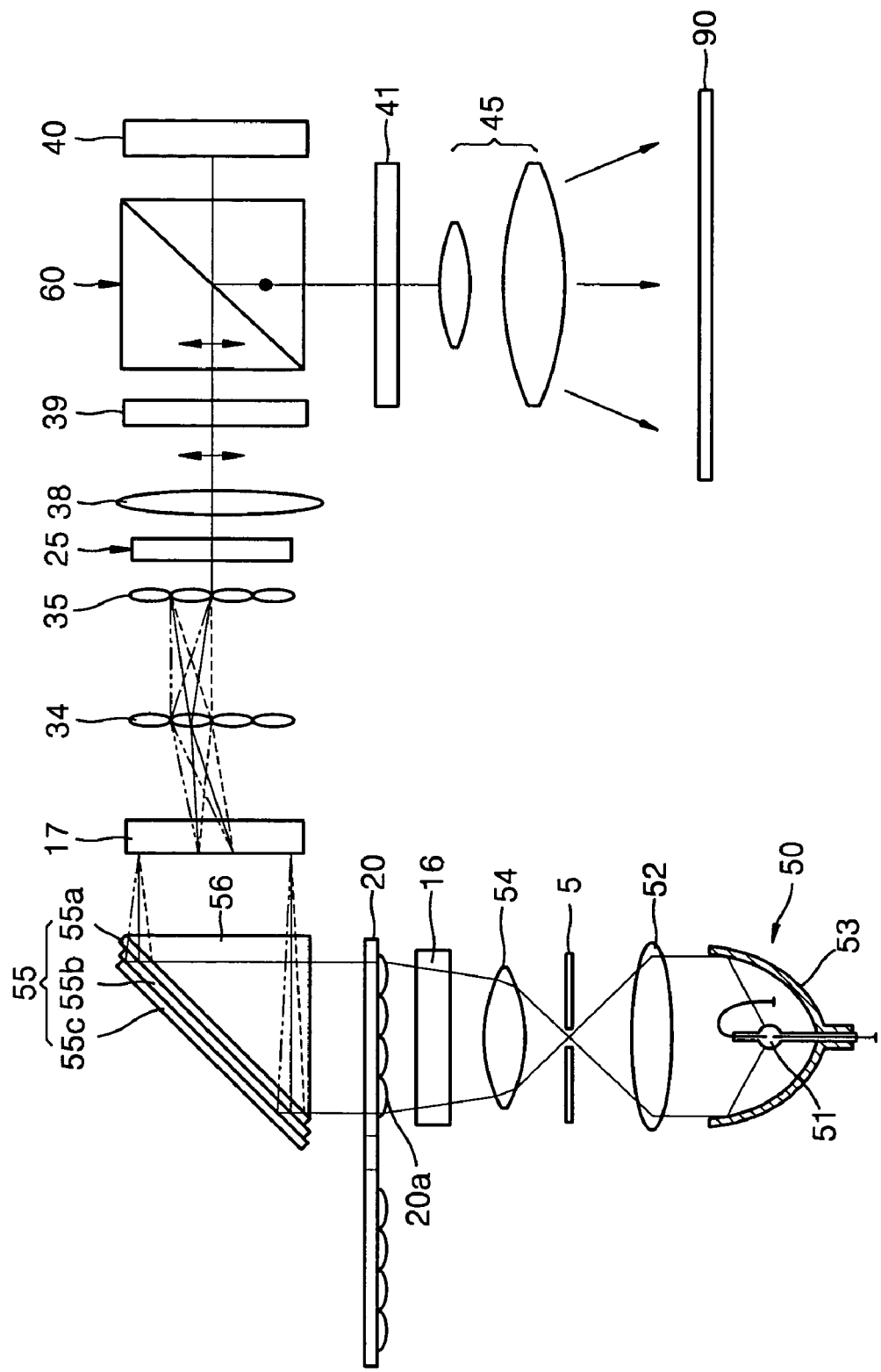
FIG. 11 is a schematic diagram of a modified example of a projection system according to the first exemplary embodiment of the present invention.

FIG. 11 is a schematic diagram of a modified example of a projection system according to the first exemplary embodiment of the present invention. Referring to FIG. 11, a modified projection system comprises a light source 50, a scrolling unit 20, a color separator 55, a PCS 25, a light valve 40, and a projection lens unit 45 that are sequentially arranged. The scrolling unit 20 rotates so as to scroll a light beam emitted from the light source 50. The color separator 55 separates a light beam transmitted by the scrolling unit 20 according to color. The PCS 25 converts the polarization of the beams transmitted by the color separator 55 into a single polarization. The light valve 40 processes the beams transmitted by the PCS 25 according to an image signal and forms a picture. The projection lens unit 45 magnifies the picture formed by the light valve 40 and projects the magnified picture onto the screen 90.

The light source 50 comprises a lamp 51 for generating a light beam and a reflection mirror 53 for reflecting the light beam emitted from the lamp 51 and for guiding the path of the reflected light beam. The reflection mirror 53 may be an elliptical mirror whose first focal point is the position of the lamp 51 and whose second focal point is a point where light is focused. Alternatively, the reflection mirror 53 may be a parabolic mirror which uses the lamp 51 as a focal point and which collimates the light beam emitted from the lamp 51. The reflection mirror 53 shown in FIG. 11 is a parabolic mirror. Accordingly, a first collimating lens 52 for focusing incident light is also included.

A spatial filter 5, for controlling the divergence angle of light emitted from the light source 50, and a second collimating lens 54, for collimating an incident beam, are sequentially installed on the light path between the first collimating lens 52 and the scrolling unit 20. Since the spatial filter 5 is already described above and the second collimating lens 54 functions as the collimating lens 14 in the first embodiment, they will not be described here in detail.

The first cylindrical lens 16 for reducing the width of a light beam incident upon the scrolling unit 20 is installed in front of the scrolling unit 20.

As shown in FIG. 5, the scrolling unit 20 may comprise with a single spiral lens disk on which at least one cylindrical lens cell 20a is spirally arranged. Alternatively, as shown in FIG. 6, the scrolling unit 20 may comprise first and second spiral lens disks 26 and 27 and a glass rod 28. Since the principle of scrolling incident light by rotation of the scrolling unit 20 is already described above, it will not be described here in detail.

The color separator 55 comprises first, second, and third dichroic filters 55a, 55b, and 55c for transmitting or reflecting incident light according to color. In contrast, in the projection system of FIG. 4, the first, second, and third dichroic filters 55a, 55b, and 55c are installed parallel to one another. The light beams incident on the scrolling unit 20 pass at different angles through different areas of a cylindrical lens cell 20a. The light beams are incident upon the color separator 55 and separated into beams of different colors by the first, second, and third dichroic filters 55a, 55b, and 55c. Finally, the separated light beams are advanced at different angles. Also, in contrast with the projection system of FIG. 4, a prism 56 is additionally included between the scrolling unit 20 and the color separator 55 so as to transfer an incident light to the color separator 55 without changing the path of the light.

The second cylindrical lens 17, the first and second fly-eye lens arrays 34 and 35, the PCS 25, the relay lens 38, the polarizer 39, and the PBS 60 are sequentially arranged on the light path between the color separator 55 and the light valve 40. The second cylindrical lens 17 restores the original width of the beam narrowed by the first cylindrical lens 16. Since the first and second fly-eye lens arrays 34 and 35, the PCS 25, the relay lens 38, the PBS 60, and the light valve 40 are already described above, they will not be described here in detail.

The projection lens unit 45 magnifies the picture formed by the light valve 40 and reflected by the PBS 60 and projects the magnified picture onto the screen 90.

Figure 12:
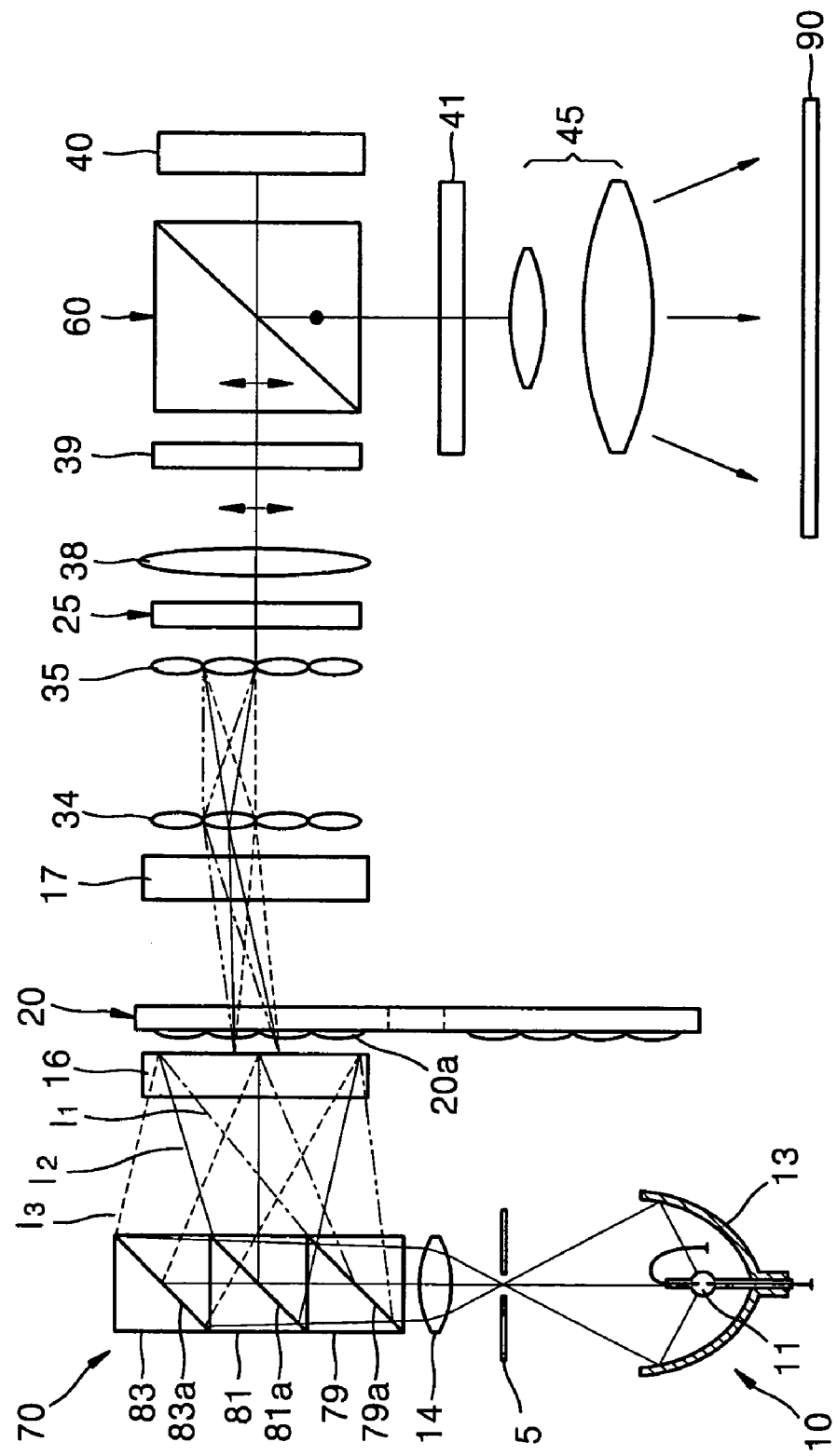
FIG. 12 is a schematic diagram of another modified example of a projection system according to the first exemplary embodiment of the present invention.

FIG. 12 is a schematic diagram of another modified example of a projection system according to the first exemplary embodiment of the present invention. Since this projection system is similar to the projection system of FIG. 4 except that an optical pipe 70 is used as a color separator, only the optical pipe 70 will be described here in detail.

Referring to FIG. 12, the optical pipe 70 includes first, second, and third dichroic prisms 79, 81, and 83, which separate an incident beam into first, second, and third color beams I1, I2, and I3 by reflecting beams in corresponding wavelength ranges and transmitting beams in all other wavelength ranges.

The first dichroic prism 79 has a first dichroic filter 79a, which reflects the first color beam I1 of the incident beam and transmits the second and third color beams I2, and I3. For example, the first dichroic filter 79a reflects a red beam R and transmits green and blue beams G and B.

The second dichroic prism 81 is attached to the first dichroic prism 79 and has a second dichroic filter 81a. The second dichroic filter 81a reflects the second color beam I1, for example the G beam, of the incident beam and transmits the first and third color beams I1, and I3, for example the R and B beams.

The third dichroic prism 83 is attached to the second dichroic prism 81 and has a third dichroic filter 83a. The third dichroic filter 83a reflects the third color beam I3, for example the B beam, of the incident beam and transmits the first and second color beams I1, and I2, for example the R and G beams. The third dichroic filter 83a may be replaced by a total reflection mirror which can reflect the entire incident beam.

The beam emitted from the light source 10 is thereby separated into beams of different colors by the optical pipe 70 having such a configuration, and the beams of different colors are directed toward the scrolling unit 20.

Figure 13:
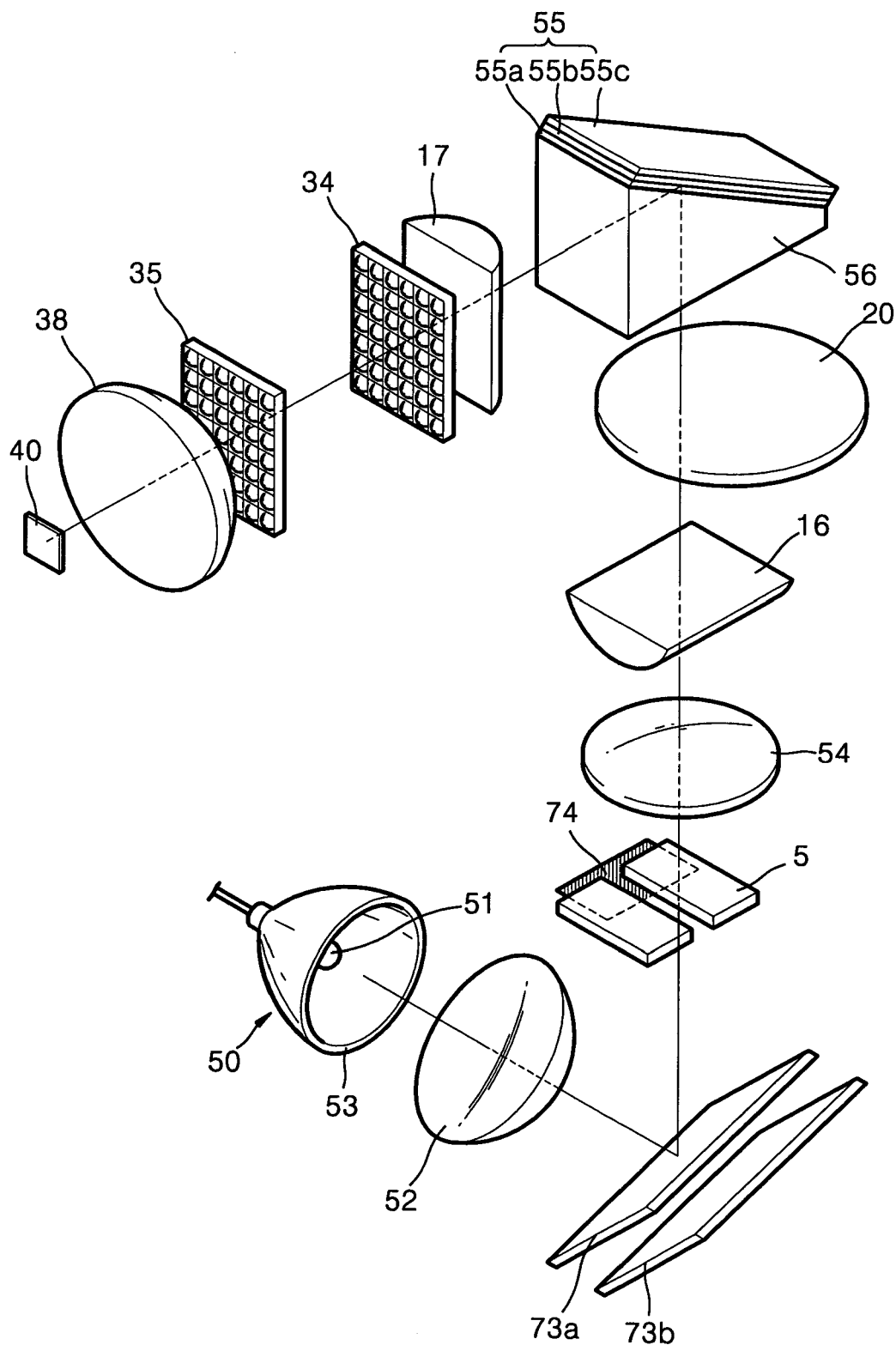
FIG. 13 is a perspective view schematically showing an arrangement of a projection system according to a second exemplary embodiment of the present invention.
Figure 14:
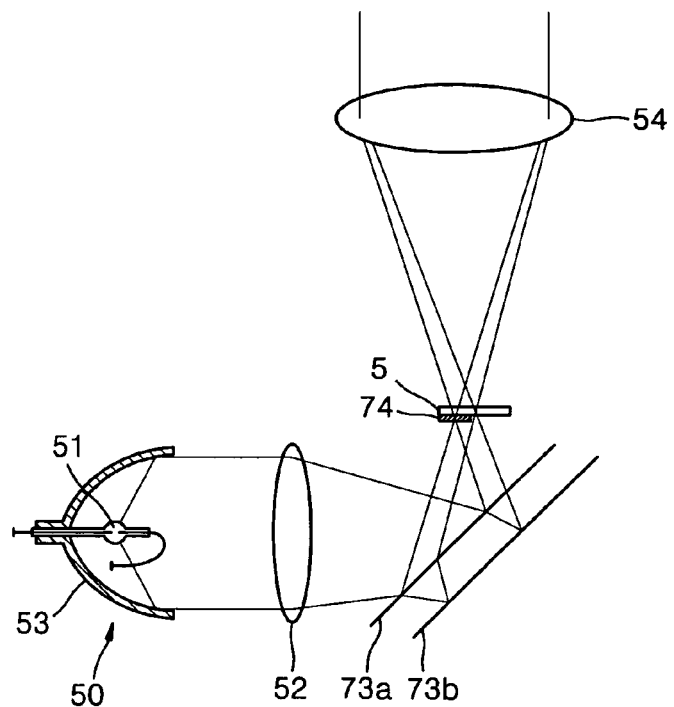
FIG. 14 is a schematic diagram illustrating a process in which an unpolarized beam radiated from a light source is converted into a beam with one polarized component by the PCS of FIG. 13.

A projection system according to a second exemplary embodiment of the present invention will now be described with exemplary reference to FIGS. 13 and 14. FIG. 13 is a perspective view schematically showing an arrangement of a projection system according to a second exemplary embodiment of the present invention. FIG. 14 is a schematic diagram for illustrating a process in which an unpolarized beam radiated from a light source is converted into a beam with a single polarization by the PCS of FIG. 13.

Referring to FIG. 13, a projection system according to the second exemplary embodiment of the present invention includes a light source 50, a PCS, a scrolling unit 20, a color separator 55, and a light valve 40, which are sequentially arranged. The PCS converts a beam emitted from the light source 50 into a beam with a single polarization. The scrolling unit 20 rotates so as to scroll the beam transmitted by the PCS. The color separator 55 separates the beam transmitted by the scrolling unit 20 into beams of different colors. The light valve 40 processes the beams transmitted by the color separator 55, according to an image signal, and forms a color picture.

A first collimating lens 52 is positioned between the light source 50 and the PCS. A spatial filter 5, a second collimating lens 54, and a first cylindrical lens 16 are sequentially arranged between the PCS and the scrolling unit 20.

As in the projection system of FIG. 11, the color separator 55 comprises first, second, and third dichroic filters 55a, 55b, and 55c, which are installed parallel to one another. A prism 56 is further included between the scrolling unit 20 and the color separator 55 so as to transfer an incident light to the color separator 55 without change of the path of the light.

A second cylindrical lens 17, first and second fly-eye lens arrays 34 and 35, and a relay lens 38 are sequentially arranged on the light path between the color separator 55 and the light valve 40. Although not shown in FIG. 13, a PBS may be installed between the relay lens 38 and the light valve 40, and a projection lens unit may be installed on the path along which the color picture formed by the light valve 40 is reflected by the PBS.

Since the projection system having such a structure is similar to the projection system of FIG. 11 except for the structure and location of the PCS, only the PCS will be described here in detail.

Referring to FIGS. 13 and 14, the PCS includes a polarization separator 73a, a reflector 73b, and a ½ wavelength plate 74. The polarization separator 73a reflects a first beam with a first linear polarization, for example an S polarization, from a beam radiated from the light source 50 and transmits a second beam with a second linear polarization, for example a P polarization. The reflector 73b is installed away from the polarization separator 73a and reflects the second beam transmitted by the polarization separator 73a back to the polarization separator 73a. The ½ wavelength plate 74 is installed on the path of one of the first beam reflected by the polarization separator 73a and the second beam reflected by the reflector 73b and passed through the polarization separator 73a, and changes the polarization of the beam that passes through it. The ½ wavelength plate 74 can be installed close to the spatial filter 5, that is, installed at or around the focal point of the first or second beam.

In the above structure, the beam emitted from the light source 50 focuses on the first collimating lens 52 and then passes through the polarization separator 73a and/or the reflector 73b. At this time, the light beam is separated into the first and second beams having different polarizations, and each of the first and second beams is focused. The direction in which the light beam is separated into the first and second beams is perpendicular to a color scrolling direction, that is, the direction in which color bars form on the light valve 40 are scrolled. The polarization component of one of the first and second beams is changed by the ½ wavelength plate 74. Hence, the resultant first and second beams have identical polarizations and are advanced toward the second collimating lens 54.

Figure 15:
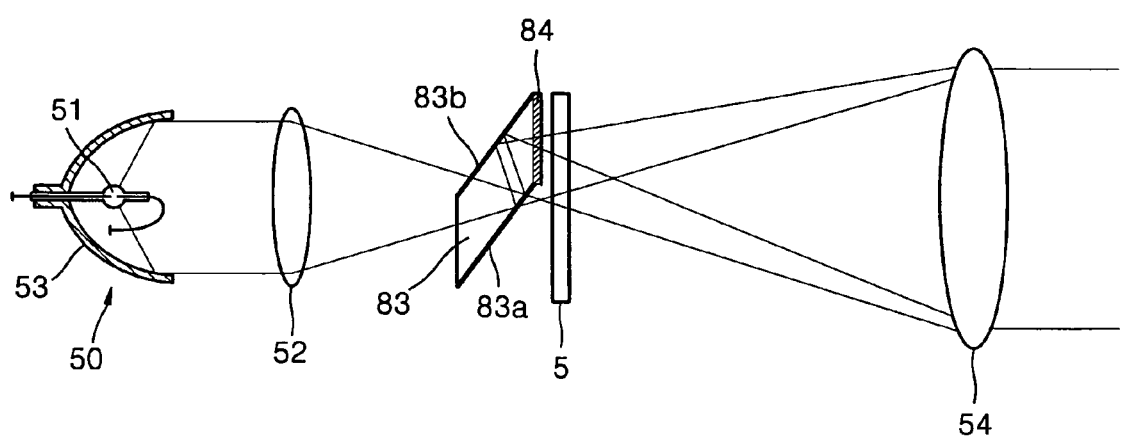
FIG. 15 is a schematic diagram illustrating a process in which an unpolarized beam radiated from a light source is converted into a beam with one polarized component by another PCS that can be adopted in the projection system according to a second exemplary embodiment of the present invention.

FIG. 15 shows another PCS that can be adopted in the projection system according to the second exemplary embodiment of the present invention. Referring to FIG. 15, this PCS includes a prism 83 and a ½ wavelength plate 84 attached to the emission surface of the prism 83. A polarization separator 83a and a reflector 83b are installed on the opposite sides of the prism 83. The prism 83 has an incidence surface through which the beam emitted from the light source 50 enters.

Since the polarization separator 83a, the reflector 83b, and the ½ wavelength plate 84 function similarly to their corresponding parts shown in FIG. 14, they will not be described here in detail.

Figure 16:
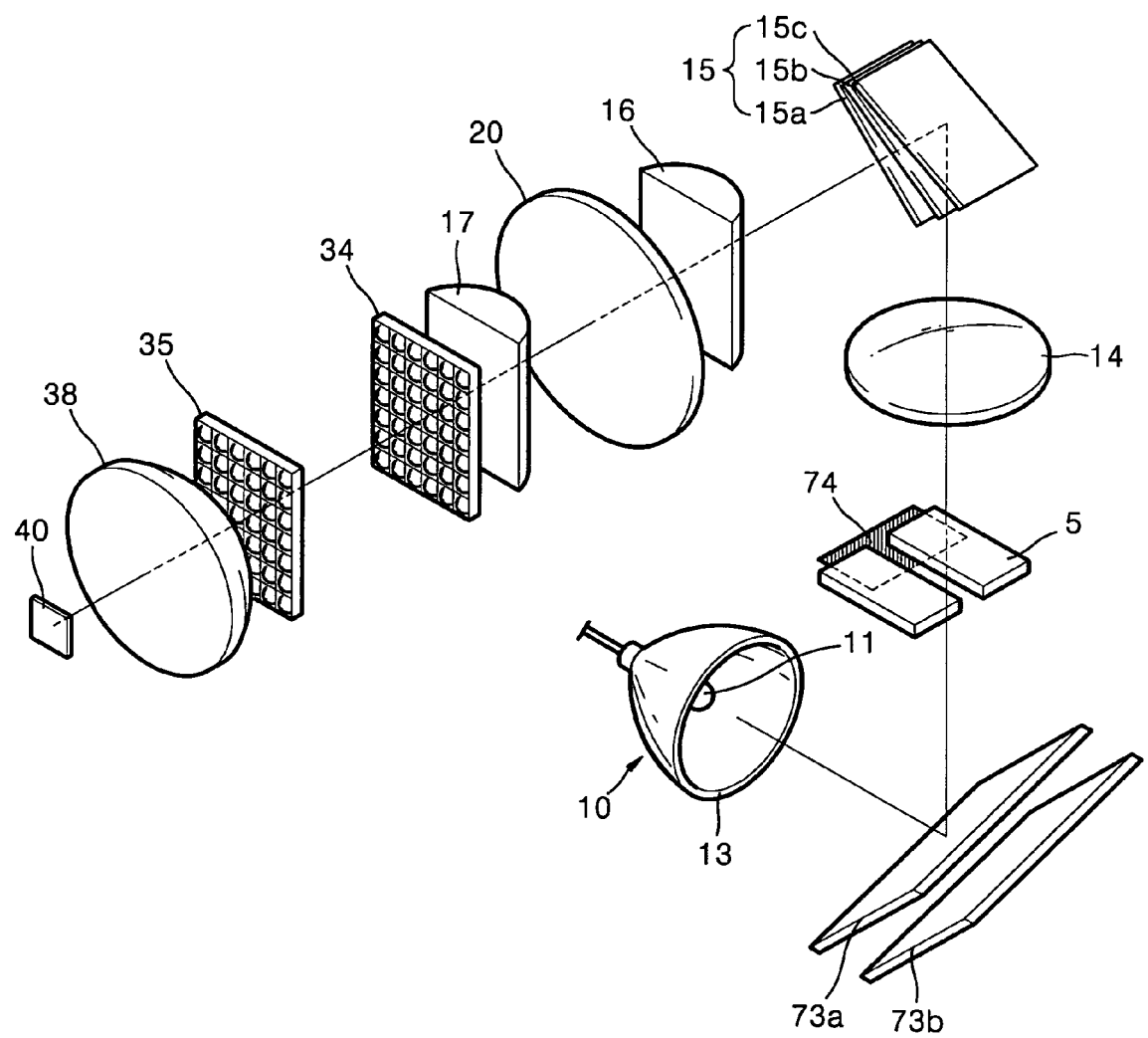
FIG. 16 is a perspective view schematically showing an arrangement of a modified example of the projection system according to the second exemplary embodiment of the present invention.

FIG. 16 is a perspective view schematically showing an arrangement of a modified example of a projection system according to the second exemplary embodiment of the present invention. Referring to FIG. 16, this projection system includes a light source 10, a PCS, a color separator 15, a scrolling unit 20, and a light valve 40, which are sequentially arranged. The PCS converts a beam emitted from the light source 10 into a beam with a single polarization. The color separator 15 separates the beam transmitted by the PCS into beams of different colors. The scrolling unit 20 scrolls the beams of different colors obtained by the color separator 15. The light valve 40 processes the beams transmitted by the scrolling unit 20, according to an image signal, and forms a color picture.

A spatial filter 5 and a collimating lens 14 are sequentially arranged between the PCS and the color separator 15.

The color separator 15 is constructed with first, second, and third dichroic filters 15a, 15b, and 15c, which are installed aslant at different angles with respect to an incident optical axis. The optical pipe 70 of FIG. 12 may be used instead of the color separator 15.

A first cylindrical lens 16 is installed between the color separator 15 and the scrolling unit 20. A second cylindrical lens 17, first and second fly-eye lens arrays 34 and 35, and a relay lens 38 are sequentially arranged on the light path between the scrolling unit 20 and the light valve 40. Although not shown in FIG. 16, a PBS may be installed between the relay lens 38 and the light valve 40, and a projection lens unit may be installed on the path along which the color picture formed by the light valve 40 is reflected by the PBS.

The PCS comprises a polarization separator 73a, a reflector 73b, and a ½ wavelength plate 74. Since the PCS is similar to the PCS shown in FIGS. 13 and 14, it will not be described here in detail. The PCS of FIG. 15 may be used as the PCS of FIG. 16.

As described above, a projection system according to the present invention has the following effects. First, a PCS for converting an unpolarized white light beam emitted from a light source into a beam having a single polarization is installed in front of or behind a color separator, thereby increasing optical efficiency and simplifying the projection system.

Second, instead of a scrolling unit for each individual color, a single scrolling unit is installed to deal with all color beams, thereby minimizing the size of the projection system.

Third, scrolling is performed by rotating the scrolling unit in one direction without changing the direction, thereby achieving continuous, consistent scrolling. Also, the single scrolling unit can be used to scroll all color beams, thereby keeping the speed of color bars constant. The synchronization of the color bars is easily controlled.

While the present invention has been shown and described with reference to exemplary embodiments thereof, it will be understood by those of ordinary skill in the art that various changes in form and details may be made therein without departing from the spirit and scope of the present invention as defined by the following claims.

What is claimed is:

1. A projection system comprising:
   a light source;
   a color separator which separates an incident beam according to color;
   a scrolling unit, comprising at least one lens cell, which converts the rotation of the lens cell into a rectilinear motion of an area of the lens cell through which light passes so that an incident beam is scrolled;
   a light valve which processes a beam transmitted by the color separator and the scrolling unit according to an image signal and which forms a color picture;
   a projection lens unit which magnifies the color picture formed by the light valve and which projects the magnified color picture onto a screen;
   a polarization conversion system installed, between the color separator and the light valve, which converts the incident beam into a beam with a single polarization; and
   first and second cylindrical lenses respectively installed in front of and behind the scrolling unit.

2. The projection system of claim 1, wherein
   a first and a second fly-eye lens array are arranged on a light path between the color separator and the light valve, and the polarization conversion system is installed behind the second fly-eye lens array.

3. The projection system of claim 2, wherein the polarization conversion system comprises:
a plurality of polarization beam splitters disposed perpendicular to the traveling direction of light; and
a plurality of ½ wavelength plates installed on emission surfaces of alternate polarization beam splitters.

4. The projection system of claim 2, wherein the thickness of each of the polarization beam splitters is half of the size of a lens cell of the second fly-eye lens array.

5. The projection system of claim 1, wherein:
the color separator includes first, second, and third dichroic filters installed aslant at different angles between the optical source and the scrolling unit; and
wherein each dichroic filter transmits a beam of one color and reflects beams of other colors.

6. The projection system of claim 1, wherein:
the color separator includes first, second, and third dichroic prisms sequentially attached to one another between the optical source and the scrolling unit; and
wherein each dichroic prism comprises a dichroic filter which transmits a beam of one color from an incident beam and reflects beams of other colors.

7. The projection system of claim 1, wherein:
the color separator includes first, second, and third dichroic filters installed in parallel between the optical source and the scrolling unit; and
each dichroic filter transmits a beam of one color from an incident beam and reflect beams of other colors.

8. The projection system of claim 7, further comprising a prism installed in front of the first, second, and third dichroic filters.

9. The projection system of claim 1, wherein the scrolling unit comprises a spiral lens disk on which at least one cylindrical lens cell is spirally arranged.

10. The projection system of claim 1, further comprising a polarization beam splitter, installed on a light path between the polarization conversion system and the light valve, which transmits a beam with a single polarization and reflects a beam with the other polarization.

11. The projection system of claim 1, wherein the polarization beam splitter comprises a wire grid polarization beam splitter.

12. A projection system comprising:
a light source;
a color separator which separates an incident beam according to color;
a scrolling unit, comprising at least one lens cell, which converts the rotation of the lens cell into a rectilinear motion of an area of the lens cell through which light passes so that an incident beam is scrolled;
a light valve which processes a beam transmitted by the color separator and the scrolling unit according to an image signal and which forms a color picture;
a projection lens unit which magnifies the color picture formed by the light valve and which projects the magnified color picture onto a screen; and
a polarization conversion system installed, between the color separator and the light valve, which converts the incident beam into a beam with a single polarization;
wherein the scrolling unit comprises
first and second spiral lens disks, which are installed apart from each other and which each include at least one cylindrical lens cell that is spirally arranged, and
a glass rod installed between the first and second spiral lens disks.

13. The projection system of claim 1, further comprising a spatial filter, installed between the light source and the scrolling unit, which has a slit for controlling the divergence angle of a beam emitted from the light source.

14. A projection system comprising:
a light source;
a color separator which separates an incident beam according to color;
a scrolling unit, comprising at least one lens cell, which converts the rotation of the lens cell into a rectilinear motion of an area of the lens cell through which light passes so that an incident beam is scrolled;
a light valve which processes a beam transmitted by the color separator and the scrolling unit according to an image signal and which forms a color picture;
a projection lens unit which magnifies the color picture formed by the light valve and which projects the magnified color picture onto a screen;
a polarization conversion system installed between the light source and the color separator, which converts the incident beam into a beam with a single polarization; and
first and second cylindrical lenses respectively installed in front of and behind the scrolling unit.

15. The projection system of claim 14, wherein the polarization conversion system comprises:
a polarization separator which reflects a first beam with a first linear polarization from a beam emitted from the light source and which transmits a second beam with a second linear polarization;
a reflector, installed apart from the polarization separator, which reflects the second beam back to the polarization separator; and
a ½ wavelength plate, installed on the path of one of the first beam reflected by the polarization separator and the second beam reflected by the reflector and then passed through the polarization separator, which changes the polarization of the first or second beam.

16. The projection system of claim 15, wherein the ½ wavelength plate is installed at the focal point of the first or second beam.

17. The projection system of claim 16, wherein
a plurality of color beams are projected onto the light valve so that color bars are formed, and
the incident beam is separated into the first and second beams in a direction perpendicular to the direction in which the color bars are arranged.

18. The projection system of claim 14, wherein the color separator includes first, second, and third dichroic filters, installed aslant at different angles between the optical source and the scrolling unit, which each transmit a beam of one color from an incident beam and reflect beams of other colors.

19. The projection system of claim 14, wherein:
the color separator includes first, second, and third dichroic prisms that are sequentially attached to one another between the optical source and the scrolling unit; and
each of the first, second, and third dichroic prisms respectively include a first, second, and third dichroic filter which transmit a beam of one color from an incident beam and reflects beams of other colors.

20. The projection system of claim 14, wherein the color separator includes first, second, and third dichroic filters installed in parallel between the scrolling unit and the light valve and which each transmit a beam of one color from an incident beam and reflect beams of other colors.

21. The projection system of claim 20, further comprising a prism installed in front of the first, second, and third dichroic filters.

22. The projection system of claim 14, wherein the scrolling unit comprises a spiral lens disk on which at least one cylindrical lens cell is spirally arranged.

23. The projection system of claim 14, further comprising a spatial filter installed between the light source and the scrolling unit, comprising a slit for controlling the divergence angle of a beam emitted from the light source.

24. The projection system of claim 14, further comprising first and second fly-eye lens arrays arranged on the light path between the scrolling unit and the light valve.

25. The projection system of claim 14, wherein the polarization conversion system comprises:
 a polarization separator which reflects a first beam with a first linear polarization from a beam emitted from the light source and which transmits a second beam with a second linear polarization;
 a reflector, installed apart from the polarization separator, which reflects the first beam; and
 a ½ wavelength plate, installed on the path of the first beam reflected by the reflector, which changes the polarization of the first beam.

26. The projection system of claim 25, wherein the polarization conversion system includes a prism, on the opposite sides of which are installed the polarization separator and the reflector and through an incidence surface of which the beam emitted from the light source passes.

27. The projection system of claim 25, wherein the ½ wavelength plate is attached to an emission surface of the prism.

28. A projection system comprising:
 a light source;
 a color separator which separates an incident beam according to color;
 a scrolling unit, comprising at least one lens cell, which converts the rotation of the lens cell into a rectilinear motion of an area of the lens cell through which light passes so that an incident beam is scrolled;
 a light valve which processes a beam transmitted by the color separator and the scrolling unit according to an image signal and which forms a color picture;
 a projection lens unit which magnifies the color picture formed by the light valve and which projects the magnified color picture onto a screen; and
 a polarization conversion system installed between the light source and the color separator, which converts the incident beam into a beam with a single polarization
 wherein the scrolling unit comprises
  first and second spiral lens disks, which are installed apart from each other and which each include at least one cylindrical lens cell that is spirally arranged, and
  a glass rod installed between the first and second spiral lens disks.

* * * * *